A. B. LOERKE.
SAUSAGE CASE TURNER.
APPLICATION FILED MAR. 11, 1912.
1,038,912.　　　　　　　　　　Patented Sept. 17, 1912.
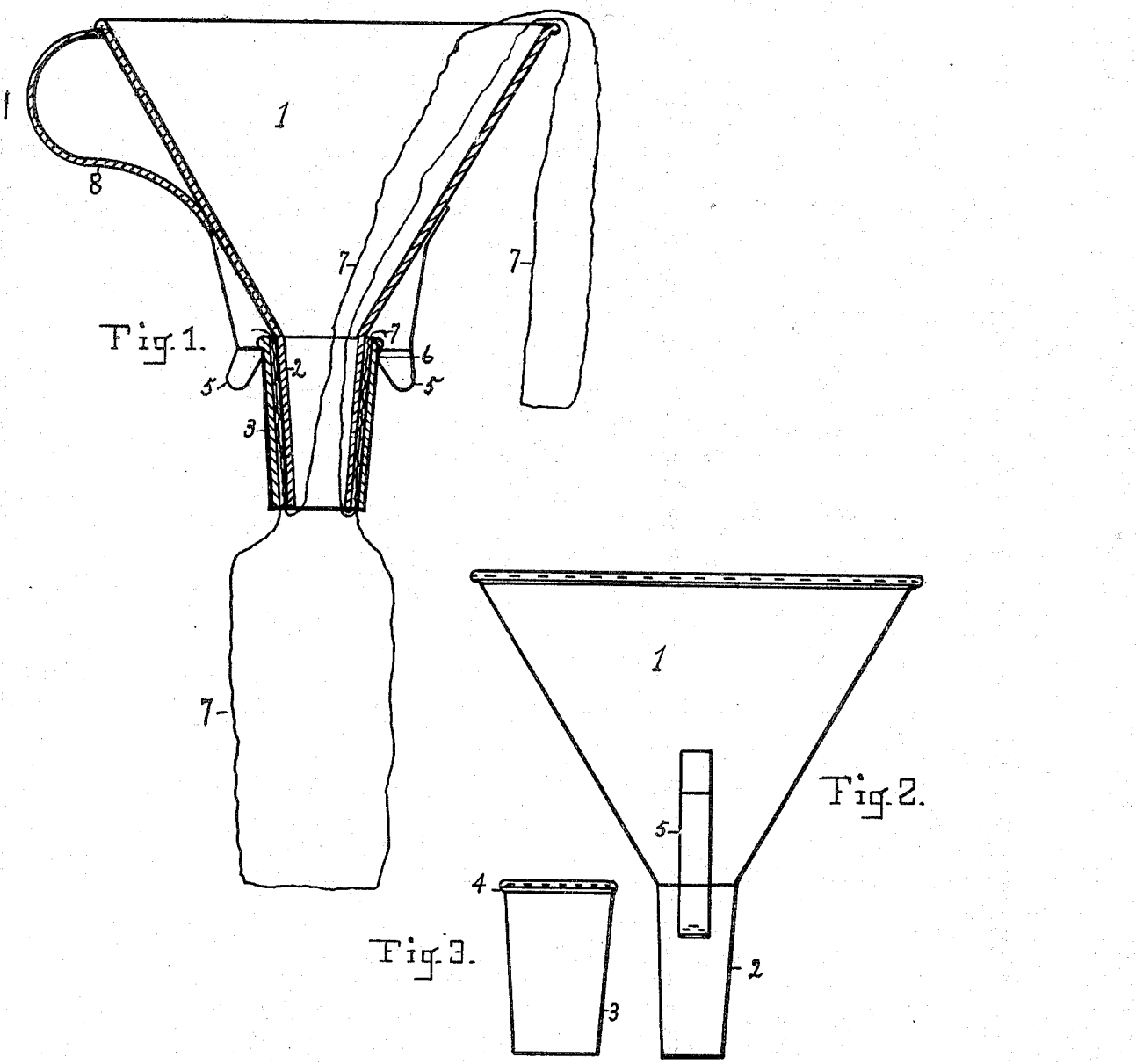

UNITED STATES PATENT OFFICE.

ANTHONY B. LOERKE, OF MENASHA, WISCONSIN.

SAUSAGE-CASE TURNER.

1,038,912.

Specification of Letters Patent.    Patented Sept. 17, 1912.

Application filed March 11, 1912. Serial No. 682,842.

*To all whom it may concern:*

Be it known that I, ANTHONY B. LOERKE, a citizen of the United States, residing at Menasha, in the county of Winnebago and State of Wisconsin, have invented a new and useful Sausage-Case Turner, of which the following is a specification.

My invention relates to a device for turning the casings for sausages inside out in the process of cleaning the casings, whereby it can be done in much less time and just as effectually as in the usual manner of turning them entirely with the fingers of the workman, and its object is, to supply a device for the use of butchers, meat dealers, and also, for the farmers throughout the country, that will lessen the time and labor of doing this work upon any certain number of casings, and in which the cost of the entire outfit will be so insignificant as to be no bar to its universal use by all having such work to do, even in very small quantities.

My invention is shown in the accompanying drawing, in which,—

Figure 1 is a vertical section of an ordinary funnel, with the casing to be turned in it, and in the position it will assume when secured to the funnel after water has been poured in around the casing for turning the casing inside out. Fig. 2 is a side elevation of the funnel turned one quarter around from its position in Fig. 1. Fig. 3 is a side elevation of a thimble which is used in connection with the funnel.

Similar numerals indicate like parts in the several views.

The device consists of an ordinary funnel 1, or any vessel having a tapering tube of the required diameter at its lower end may be effectually used, the funnel having a tapering tube 2, of a suitable diameter, usually about three diameters of tubes will be required for the different sizes of casings, each different tube being provided with a thimble 3, for being slipped over the tube and leaving a space of one sixteenth of an inch, more or less, between thimble and tube. The large end of the thimble is provided with a wire inclosed bead, 4, for serving as a catch to be engaged by the catches 5, which are attached to the funnel bowl.

The catches 5, are provided with angular bends 6, for engaging under the wire bead, and the catches 5, being formed of spring metal, the connection and disconnection of the thimble and tube are automatic in action.

I do not confine the method of the connection and disconnection to the exact form here shown, but any of the usual methods of connecting and disconnecting thimble and tube, I consider as within the scope of my invention.

The sausage casing to be turned inside out is dropped into the bowl of the funnel and drawn down through the tube 2, and its end turned up over the end of said tube and the thimble 3, then slipped on until engaged by the catches. The funnel is then to be held by its handle or otherwise, and water poured in around the casing from any suitable supplying source, such as a pitcher, or the city water system, the water running down around the casing inside of the tube, by its weight and volume pulls the casing downward through the tube, as it is shown to be below the funnel in Fig. 1, and turns the casing inside out. This having been done, the thimble is to be removed and another casing applied as before, the operation being repeated until all the casings in any one lot are turned.

Having described my invention and the manner of using it, what I claim and desire to secure by Letters Patent, is,—

1. A sausage casing turner, consisting of a funnel, its tube, a thimble shorter but of a suitable length compared with said tube and a diameter sufficient to permit its being slipped upon the tube and leave a space sufficient for permitting a sausage casing to be held between it and said tube, a shoulder extending outward around the upper end of the thimble, and spring catches attached to opposite sides of the funnel adapted to engage under said shoulder and detachably retain the thimble upon the tube.

2. A sausage casing turner, consisting of a funnel bowl, its tube, a thimble shorter, but of a suitable length compared with said tube and a diameter sufficient to permit its being slipped upon the tube and leave a space sufficient for permitting a sausage casing to be held between it and said tube, and means for detachably connecting the thimble and tube.

3. In combination a sausage casing turner, consisting of an open ended tapering tube, an enlarged upper end to said tube, a thimble shorter, but of slightly greater diameter than the largest end of said tube adapted to be slipped on to said tube and means at its upper end for its detachable engagement with said tube.

ANTHONY B. LOERKE.

Witnesses:
   Jos. L. Fieweger,
   E. L. Jourdam.